United States Patent
Wiesand

(10) Patent No.: US 10,112,633 B2
(45) Date of Patent: Oct. 30, 2018

(54) RAIL VEHICLE UNIT

(71) Applicant: SIEMENS AKTIENGESELLSCHAFT, Munich (DE)

(72) Inventor: Manfred Wiesand, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 15/105,747

(22) PCT Filed: Dec. 19, 2014

(86) PCT No.: PCT/EP2014/078753
§ 371 (c)(1),
(2) Date: Jun. 17, 2016

(87) PCT Pub. No.: WO2015/091955
PCT Pub. Date: Jun. 25, 2015

(65) Prior Publication Data
US 2016/0318533 A1 Nov. 3, 2016

(30) Foreign Application Priority Data
Dec. 20, 2013 (DE) .................. 10 2013 226 966

(51) Int. Cl.
*G05D 1/00* (2006.01)
*G05D 3/00* (2006.01)
(Continued)

(52) U.S. Cl.
CPC ........ *B61L 27/0038* (2013.01); *B60T 8/1705* (2013.01); *B60T 8/1766* (2013.01);
(Continued)

(58) Field of Classification Search
None
See application file for complete search history.

(56) References Cited

U.S. PATENT DOCUMENTS

| 4,659,149 A | 4/1987 | Rumsey et al. |
| 4,671,577 A | 6/1987 | Woods |

(Continued)

FOREIGN PATENT DOCUMENTS

| AU | 2003294839 A1 | 7/2004 |
| CA | 2170857 C | 5/2000 |

(Continued)

*Primary Examiner* — Anne M Antonucci
*Assistant Examiner* — Kenny A. Taveras
(74) *Attorney, Agent, or Firm* — Laurence Greenberg; Werner Stemer; Ralph Locher

(57) ABSTRACT

A rail vehicle combination has a first motor train unit and at least one second motor train unit, each of which has a drive mechanism and a brake mechanism. Each of the brake mechanisms of the at least two motor train units has a plurality of brake units. In order to obtain a flexible utilization of the brake mechanism capacities of the coupled motor train units, a brake effect management system is formed in the coupled state. The management system is of a higher order than the brake mechanisms and is connected thereto. The management system is configured to distribute a braking effect onto the brake units of the at least two motor train units.

8 Claims, 3 Drawing Sheets

(51) Int. Cl.
  *G06F 7/00*    (2006.01)
  *G06F 17/00*   (2006.01)
  *B61L 27/00*   (2006.01)
  *B60T 8/17*    (2006.01)
  *B60T 13/66*   (2006.01)
  *B60T 8/1766*  (2006.01)
  *B61L 27/04*   (2006.01)

(52) U.S. Cl.
  CPC ............ *B60T 13/662* (2013.01); *B61L 27/04* (2013.01); *B61L 2201/00* (2013.01)

(56) References Cited

U.S. PATENT DOCUMENTS

| | | |
|---|---|---|
| 4,692,867 A | 9/1987 | Poole |
| 5,713,639 A | 2/1998 | Doto et al. |
| 5,752,748 A | 5/1998 | Schramm et al. |
| 2010/0292875 A1 | 11/2010 | Gross |
| 2012/0296501 A1 | 11/2012 | Matsuyama et al. |
| 2014/0046514 A1 | 2/2014 | Jennek et al. |

FOREIGN PATENT DOCUMENTS

| | | |
|---|---|---|
| DE | 4339570 A1 | 5/1995 |
| DE | 19848990 A1 | 4/2000 |
| DE | 19848994 A1 | 5/2000 |
| DE | 10128897 C1 | 1/2003 |
| DE | 102011006002 A1 | 9/2012 |
| EP | 0152300 A2 | 8/1985 |
| EP | 1266814 A2 | 12/2002 |
| JP | S62155168 A | 7/1987 |
| RU | 78154 U1 | 11/2008 |
| WO | WO 2004/054840 A1 * | 12/2003 |
| WO | 2004054840 A1 | 7/2004 |
| WO | 2007096213 A1 | 8/2007 |

* cited by examiner

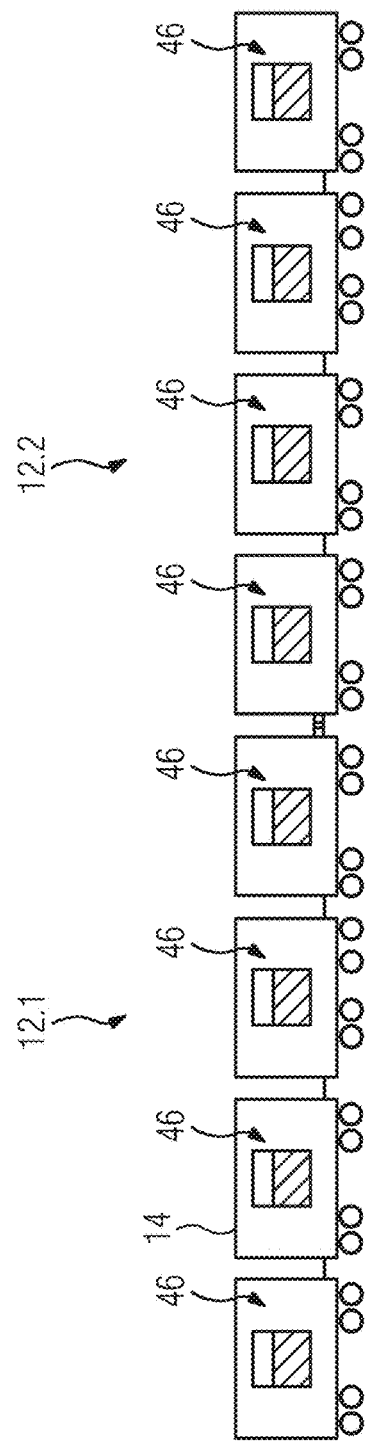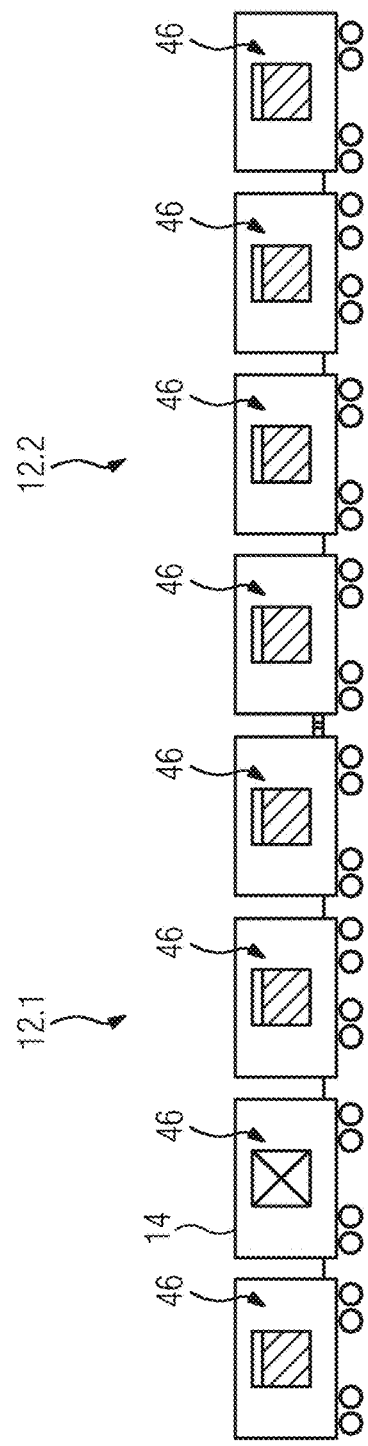

RAIL VEHICLE UNIT

BACKGROUND OF THE INVENTION

Field of the Invention

The invention relates to a rail vehicle unit comprising a first motor train unit and at least a second motor train unit, each of which has a drive mechanism and a brake mechanism, wherein the brake mechanisms of the at least two motor train units each has a plurality of brake units.

Motor train units are being used to an increasing extent in modern rolling stock systems, which motor train units are coupled to one another, depending on the need for capacity on certain routes, in order to form a rail vehicle unit, and which can be decoupled from one another in order to be operated individually. When braking is performed in the coupled state, the brake mechanisms of the individual motor train units are activated simultaneously.

BRIEF SUMMARY OF THE INVENTION

The problem addressed by the invention is that of obtaining a flexible utilization of the brake mechanism capacities of the coupled motor train units in such a rail vehicle unit.

For this purpose, a braking effect management system is formed in the coupled state of the rail vehicle unit, which management system is of a higher order than the brake mechanisms and is connected thereto, and is intended for distributing a braking effect to brake units of the at least two motor train units. As a result, with respect to a braking effect distribution, particularly great flexibility in the utilization of the brake mechanisms of the coupled motor train units can be achieved.

The higher-order braking effect management system advantageously comprises at least one control unit, which is equipped with at least one distribution algorithm. This control unit performs a higher-order role as compared to a control device of a brake mechanism in a motor train unit, wherein this control device is provided for controlling the brake units of this motor train unit. For example, the control unit of the braking effect management system can be assigned to a level of a hierarchical control ladder that is higher than the levels of the individual motor train units. The control unit of the braking effect management system is intended, in particular, for coordinating an operation of the control devices. For this purpose, the control unit is operatively connected to the control devices of the individual motor train units with regard to data and/or control. The function of the control unit of the braking effect management system can also be performed by at least one of the control devices that is equipped with a corresponding distribution algorithm.

The distribution of the braking effect to the brake units can be carried out, in particular, on the basis of data transmitted from the brake units to the braking effect management system. The braking effect management system is advantageously equipped with an interface that receives these data, wherein an evaluation module of the distribution algorithm is provided for evaluating these data. These data can contain, e.g., information regarding an availability and/ or a maximum braking effect that can be applied.

A "motor train unit" is intended to mean a rail vehicle designed as a railcar or a combination of vehicle units that is suited for independent operation in a driving manner. For this purpose, the drive mechanisms of the motor train units are each advantageously suited for independent operation of the motor train units after the rail vehicle unit has been separated. In particular, the combination forms a unit that operates only if un separated.

A distribution of a "braking effect" can be understood to be a distribution of braking force, braking power, braking torque, or any other characteristic parameter that is representative of a braking effect. A distribution process advantageously corresponds to an allocation, by the braking effect management system, of a partial braking effect of an entire braking effect to brake units of the motor train units. The control device of the brake mechanism of the corresponding motor train unit, which has a brake unit to which a partial braking effect is allocated, controls this brake unit for the purpose of applying this partial braking effect.

The "coupled state" of the rail vehicle unit is intended to mean an operative state in which said rail vehicle unit can be operated as a connected train unit. This can be obtained, e.g., by way of subjecting the rail vehicle unit, in the coupled state, to a "christening", as is referred to in technical jargon.

In each motor train unit, the corresponding brake mechanism comprises at least one brake system, which is designed as a mechanical brake system or a regenerative brake system. In a particularly advantageous embodiment of the invention, the brake mechanism is equipped with a mechanical brake system and a regenerative brake system. The regenerative brake system is at least partially formed, in a known manner, from components of the drive mechanism, in particular, from drive motors.

A brake unit of the brake mechanism can be a complete brake system of the brake device or a subsystem of this brake system. If the motor train units are each formed as a combination of vehicle units, a brake unit can also be defined as a structure, which is allocated to a vehicle unit of the combination. A particularly effective braking effect distribution can be obtained in this manner when at least one different brake unit of the particular brake mechanism is allocated to each of the vehicle units of the combination. If the brake mechanism is equipped with different brake systems, and a vehicle unit in the combination is equipped with components of different brake systems based on different technologies, a brake unit allocated to this vehicle unit can be defined as a logical, multi-technological combination of these components. A brake unit can therefore contribute to mechanical and/or regenerative braking.

In a particularly preferred embodiment of the invention, the braking effect management system is intended for implementing a braking effect distribution for the brake mechanism of the second motor train unit depending on at least one braking parameter of the brake mechanism of the first motor train unit. As a result, an optimal braking effect distribution can be obtained that is adapted to the particular circumstances of the first motor train unit. A braking parameter of a brake mechanism can be an availability of the brake mechanism, an availability of at least one brake unit of the brake mechanism, a braking effect that can be applied by at least one brake unit, etc.

In this context it is proposed that the braking effect management system comprises a data interface connected to the brake mechanisms of the motor train units, via which interface braking parameters can be received from several, in particular, all brake units of the first and the second motor train unit, and is equipped with a distribution algorithm intended for allocating a partial braking effect to each of these brake units, at the least, on the basis of the braking parameters.

Braking parameters of a brake unit are, advantageously, at least one braking effect that can be applied by the brake unit and a mass that must be braked. This applicable braking effect is a braking effect, in particular, that can be applied by the particular brake unit at the particular present operating point. Particularly advantageously, said braking effect can account for predefined characteristic curves and/or present operating conditions, such as, e.g., thermal loads. The operating parameters of the individual brake units are preferably gathered via the data interface of the braking effect management system and are evaluated by its control unit, which implements the distribution algorithm. The distribution algorithm is advantageously based on an optimization method. According to one embodiment, the distribution algorithm can be intended for optimizing a characteristic parameter for wear. In this case, partial braking effects can be allocated to regenerative brake units with high priority, wherein partial braking effects are allocated to mechanical brake units in such a way that a preferably uniform loading of the mechanical brake units results.

In addition, in the case of brake units equipped with an anti-skid device, an operating state of the anti-skid device can be a braking parameter of each of these brake units. This is advantageous, in particular, when the distribution algorithm is implemented, which algorithm is based on an optimized utilization of the coefficient of adhesion. In this case, the partial braking effects to be allocated can be calculated for the purpose of minimizing the coefficient of adhesion that is utilized, wherein the brake units are preferably acted upon up to a definable limit of adhesion. In the simplest case, the operating state can be characterized by the signals "active" or "inactive".

In this context, it is proposed that the distribution algorithm is designed to take a first limit of adhesion into consideration when calculating the partial braking effects to be allocated if the anti-skid devices in the motor train units are inactive and, if at least one anti-skid device is active, taking a second limit of adhesion into consideration when calculating the partial braking effects to be allocated, which second limit is less than the first limit of adhesion.

In a particularly advantageous embodiment of the invention, it is proposed that the braking effect management system is designed such that, in the event of faulty operation of the brake mechanism of the first motor train unit, at least a portion of a braking effect to be compensated is allocated to at least one brake unit of the second motor train unit. As a result, a braking procedure to be carried out using the faulty brake mechanism can be advantageously supported by the at least one brake unit of the second motor train unit. If the braking effect to be compensated is distributed to brake units of the first motor train unit and brake units of the second motor train unit, a compensation of a faulty braking effect that is gentle on the brake mechanisms can be obtained.

A braking effect to be compensated is intended to mean a braking effect that has been lost due to the faulty operation, as compared to fault-free operation.

A braking effect compensation can also be obtained in a particularly gentle manner and by means of a simple distribution algorithm when the braking effect management system is designed such that, in the event of a complete failure of a brake unit of the brake mechanism of the first motor train unit, the braking effect to be compensated is uniformly distributed to the remaining brake units of the motor train units. In principle, a brake unit that has failed does not require separate handling by the braking effect management system, since this case can be covered by the signaling of an applicable braking effect that is zero.

In an advantageous refinement of the invention, it is proposed that the brake mechanisms of the at least two motor train units each comprise a control device, each of the at least two motor train units comprises a control system, wherein the control systems are interconnected in the coupled state of the rail vehicle unit, and the braking effect management system is formed at least from the control devices interconnected via the control systems. As a result, there is no need to install a unit that is separate from the control device and is provided especially for the function of the braking effect management system. In this case, an existing network of the control devices with the allocated brake units of the particular motor train unit and the existing control systems can be advantageously utilized. This can be implemented, e.g., particularly easily in that at least one of the control devices is programmed with a distribution algorithm.

Furthermore, an advantageous redundancy in respect of a failure of one of the control devices can be obtained.

The invention further relates to a method for braking a rail vehicle unit comprising a first motor train unit and at least a second motor train unit, each of which has a drive mechanism and a brake mechanism, wherein the brake mechanisms of the at least two motor train units each have a plurality of brake units.

It is proposed that
 a braking effect management system is formed in the coupled state of the rail vehicle unit, which management system is of a higher order than the brake mechanisms and is connected thereto,
 a braking effect is distributed by the braking effect management system to the brake units of the at least two motor train units, and
 a braking procedure is implemented according to the braking effect distribution.

With respect to the advantageous effects of the proposed method, reference is made to the comments presented above regarding the rail vehicle unit.

BRIEF DESCRIPTION OF THE SEVERAL VIEWS OF THE DRAWING

Exemplary embodiments of the invention are explained with reference to the drawings. In the drawings:

FIG. 2 shows a braking effect distribution to brake units of the rail vehicle unit during normal operation, FIG. 3 shows a braking effect distribution to brake units of the rail vehicle unit during faulty operation.

DESCRIPTION OF THE INVENTION

Figure 1:
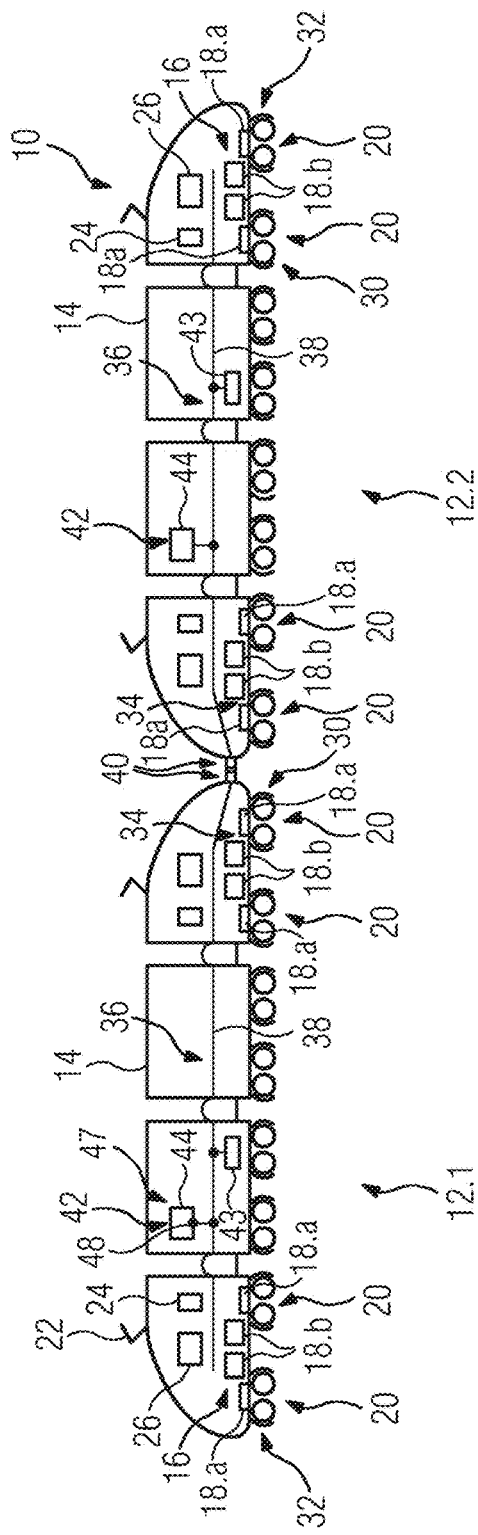
FIG. 1 shows a schematic side view of a rail vehicle unit comprising two motor train units.

FIG. 1 shows a schematic side view of a rail vehicle unit 10. In the embodiment under consideration, the rail vehicle unit 10 is designed as a combination of two motor train units 12.1 and 12.2. Further embodiments having more than two motor train units are also conceivable.

In particular, each motor train unit 12 is designed for transporting passengers. Each motor train unit 12 comprises a number of coupled-together vehicle units 14, which are designed as railroad cars and are each equipped with a passenger compartment. In addition, each motor train unit 12 is designed as a self-powered motor train unit. Therefore, the motor train units 12.1, 12.2 can be separated from one another and operated separately from one another. Coupling or decoupling the motor train units 12.1, 12.2 in order to form or separate, respectively, the rail vehicle unit 10 is carried out depending on a need for a capacity for transporting passengers.

Each motor train unit 12 comprises at least one drive mechanism 16, which enables the particular motor train unit 12 to be driven independently. In this case, the drive mechanism 16 of the first motor train unit 12.1, at least in the separated state of the rail vehicle unit 10, is independent of the drive mechanism 16 of the second motor train unit 12.2 and vice versa. In the embodiment under consideration, the drive mechanism 16 of the motor train units 12.1, 12.2 comprises drive components 18.*a*, 18.*b*. Each of the drive components 18.*a* is designed as a drive motor, which is housed in a bogie 20 of the particular motor train unit 12. The drive components 18.*b* are each designed as a power supply unit, in particular, in the form of an inverter, which supplies electrical power to an allocated drive motor.

According to the embodiment shown, the drive components 18 of the drive mechanism 16 are disposed so as to be concentrated in two vehicle units 14. Each one of these is a head end power car. It is also conceivable to concentrate the drive mechanism 16 in one or more trailing units. A further embodiment, in which the components 18 of the drive mechanism 16 are distributed across a plurality of vehicle units 14, is also possible. The head end power cars in the embodiment under consideration are each designed as railcars comprising a passenger compartment. An alternative embodiment as a traction vehicle, which is not intended for transporting passengers, is conceivable.

At least one electrical power consumer 22, a main switch 24 and a feed circuit 26 for converting a mains-side direct-current voltage or alternating voltage (each of which is depicted highly schematically) tapped by means of the electrical power consumer 22 are provided in each motor train unit for supplying the drive mechanism 16 with electrical energy. The feed circuit 26 feeds a non-illustrated intermediate circuit, from which the drive mechanism 16 and, if applicable, a power supply for auxiliaries, draw electrical energy.

Each motor train unit 12 is further equipped with a brake mechanism 30. Each brake mechanism 30 is designed for an independent operation of the particular motor train unit 12 in the separated state of the rail vehicle unit 10. In particular, the brake mechanisms 30 each meet all the mandated safety requirements, and so each motor train unit 12.1 or 12.2 is approved for operation separately from further motor train units 12 in respect of these requirements.

Each brake mechanism 30 comprises at least two brake systems 32, 34, which differ from one another with respect to braking technology. In the embodiment under consideration, a first brake system 32 is designed as a friction brake. A regenerative brake is provided as the second brake system 34, which is formed at least from components of the particular drive mechanism 16, in particular, from the drive components 18.*a*. The design and the mode of operation of a friction brake and a regenerative brake in a rail vehicle are generally known and are not described here in greater detail.

In addition, the motor train units 12 are each equipped with a control system 36. Said control system provides for a data- and control-related connection, in particular, of terminal function components, which are intended to be controlled, and corresponding control units of the particular motor train unit 12 by means of at least one bus system 38. This is also generally known and is not described here in greater detail. A standardized architecture for communication throughout the train is described, for example, in the TCN standard (or "train communication network").

In the coupled state of the rail vehicle unit 10, the two control systems 36 of the motor train units 12.1, 12.2 are coupled to one another in terms of data and control. In particular, for this purpose, the particular bus systems 38 are coupled to one another by means of interfaces 40. Said interfaces are disposed, in particular, in the coupling region of the motor train units 12. In particular, the interfaces 40 are each disposed in a coupling unit of the particular motor train unit 12.1 or 12.2, which coupling unit is referred to as a "coupling on the front part".

The brake mechanism 30 in each motor train unit 12 comprises at least one brake control unit 42, which is provided for controlling the particular brake systems 32, 34. The brake control unit 42 comprises a set of local control units 43, which are disposed so as to be distributed in the vehicle units 14 and each of which acts as the local control of brake components of the brake systems 32, 34. For the sake of clarity of the figure, only one of these control units 43 in a vehicle unit 14 is shown. The brake control unit 42 further comprises a central control device 44, which is of a higher order than the local control units 43 and is connected to said local control units via the bus system 38.

A hierarchical brake control system is created by means of the local control units 43 and the central control device 44, which system is described in the following. The description relates to a motor train unit 12 in general, but can be used for both motor train units 12.1, 12.2 in the exemplary embodiment under consideration.

In the motor train unit 12, a brake unit 46 is allocated to each vehicle unit 14 (see FIG. 2). Said brake unit is formed from the local brake components of the brake systems 32, 34 and the local control unit 43 or the local control units 43 of this vehicle unit 14. The allocation is carried out depending on the local equipment of the vehicle units 14, in particular depending on whether the corresponding vehicle unit 14 comprises drive components 18.*a*, 18.*b* of the drive mechanism 16 or only components of the brake system 32. A vehicle unit 14 is equipped with components of the brake system 32 and/or the brake system 34, wherein the allocated brake unit 46 is intended for mechanical or regenerative braking. The set of brake units 46 forms a lower level of a hierarchical brake control system, which comprises the central control device 44 in a middle level disposed above it.

One function of the central control device 44, in particular, consists in gathering data provided by the local control units 43. These data are based on characteristic parameters that are detected in the vehicle units 14, and are representative at least of an actual state of the particular brake unit 46. For example, the data can be representative of a momentary braking effect that can be applied by the brake unit 46 depending on local circumstances.

A distribution algorithm is implemented in the central control device 44, which algorithm, on the basis of a predefined set point braking effect to be applied by the brake mechanism 30 and on the gathered data, divides this set point braking effect into partial braking effects, each of which is allocated to a different brake unit 46 of the motor train unit.

In the coupled state of the rail vehicle unit 10, the coupling of the particular bus systems 38 results in a linking of the brake mechanisms 30—in particular of the brake control units 42—of the two motor train units 12.1, 12.2.

This physical link is utilized in order to provide a control level that applies for the entire rail vehicle unit and is of a higher order than the brake control units 42. This is carried out by means of the central control devices 44, each of which is prepared to form this upper control level for the entire rail vehicle unit by interacting via the bus systems 38.

With respect to the braking effect distribution, the control devices 44, which are interconnected via the coupled-together control systems 36, form a braking effect management system 47 for the entire rail vehicle unit. The function of the braking effect management system 47, in particular, is to distribute a braking effect to the brake units 46 of the motor train units 12.1, 12.2. In the embodiment under consideration, the control device 44 of the first motor train unit 12.1 is designed as a control unit of the braking effect management system 47.

For this purpose, said system is equipped with a corresponding distribution algorithm. In an alternative embodiment, it is feasible that this function is carried out by the control device 44 of the second motor train unit 12.1 or by the two control devices 44 working together.

The control unit of the braking effect management system 47 evaluates braking parameters during the execution of a program according to the distribution algorithm, which operating parameters are transmitted from the brake units 46 of the two motor train units 12.1, 12.2. These data are received via a data interface 48 (see FIG. 1). In particular, a braking effect that can be applied momentarily—i.e., at the present operating time—and a mass that is supposed to be braked are the operating parameters of a brake unit 46. If the brake unit 46 is designed with an anti-skid device (not shown in the figures), a further operating parameter of this brake unit 46 is the operating state of the anti-skid device.

A particular application is now described with reference to FIGS. 2 and 3. Said figures show the vehicle units 14 of the motor train units 12.1, 12.2. The partial braking effect is depicted in each vehicle unit 14 by means of a bar, which effect is allocated by the central control device 44 of the particular motor train unit 12.1 or 12.2 to the corresponding brake unit 46. In the example of FIG. 2 under consideration, it is assumed that, in the normal case, the set point braking effect is uniformly distributed among the brake units 46 in each motor train unit 12.

In the operating situation shown in FIG. 3, a brake unit 46 in the first motor train unit 12.1 communicates to the central control device 44 that a braking effect cannot be applied, e.g., due to a technical failure. In response thereto, the set point braking effect to be applied by the two brake mechanisms 30 is redistributed to the brake units 46 of the rail vehicle unit 10. This is carried out by means of the braking effect management system 47, which allocates the partial braking effects to these brake units 46 on the basis of the data from all brake units 46 of the rail vehicle unit 10. The gathering of the data and the distribution and allocation of the partial braking effects can be carried out by one of the central control devices 44 or by an interaction of said control devices and by means of a data transmission taking place via the coupled-together bus systems 38. As a result of the distribution across the entire rail vehicle unit, the absence of a brake effect resulting from the brake unit 46 being defective and, therefore, incapable of applying said brake effect can be equally distributed—across the entire rail vehicle unit—among brake units 46 of the entire rail vehicle unit 10. In the embodiment under consideration, this braking effect to be compensated is uniformly distributed to the functional brake units 46 of the entire rail vehicle unit 10. In the case of a disadvantageous limitation of the equalization to the motor train unit 12.1 in which the faulty operation occurs, the brake units 46 of this motor train unit 12.1 would be subjected to a greater load as compared to the distribution according to FIG. 3.

In the depictions in FIGS. 2 and 3, no distinctions are made between a mechanical and a regenerative braking.

Figure 4:
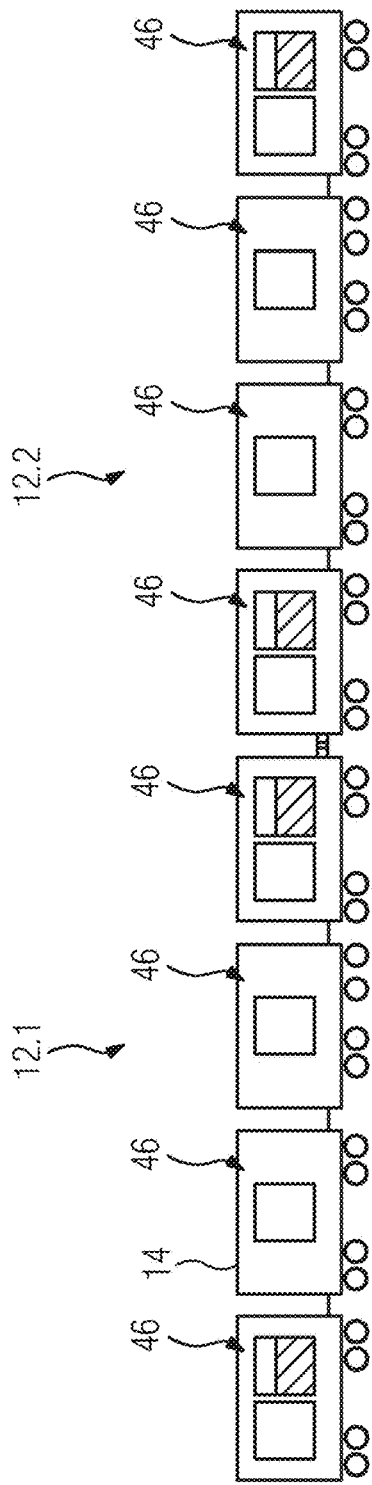
FIG. 4 shows an alternative braking effect distribution to brake units of the rail vehicle unit during normal operation.
Figure 5:
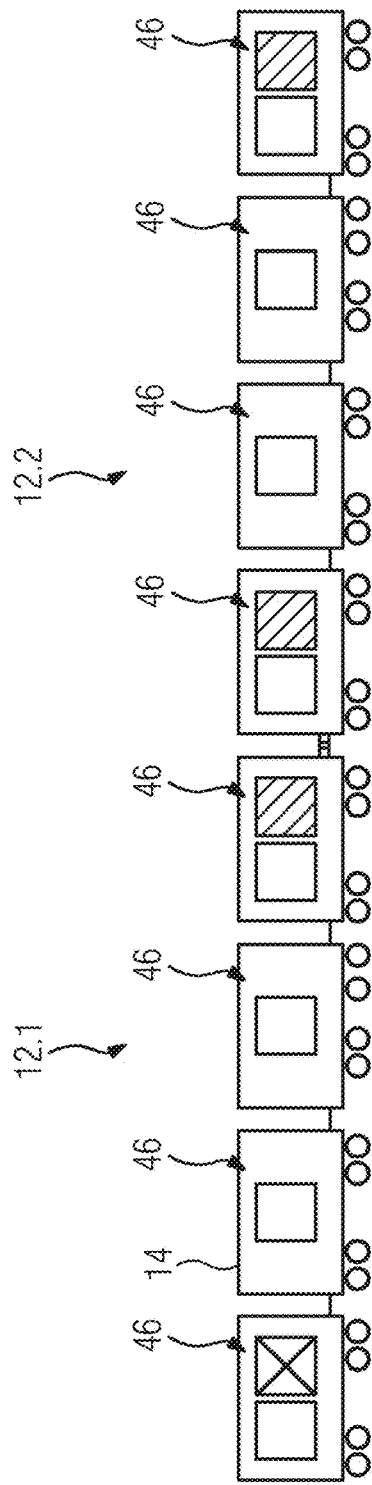
FIG. 5 shows an alternative braking effect distribution to brake units of the rail vehicle unit during faulty operation.

FIGS. 4 and 5 show, in a further application, once more with the aid of bars, the distribution of the partial braking effects among the brake units 46, wherein a distinction is made between a mechanical portion (the bar on the left in each case) and a regenerative portion (the bar on the right in each case) for the head end power cars, each of which is equipped with drive components 18 of the drive mechanism 16.

As depicted in FIG. 4 for a normal operating case, when the partial braking effects are allocated, the low-wear, regenerative components of the brake mechanism 30 are prioritized. In the case depicted, the set point braking effect is uniformly distributed to the regenerative components of the brake units 46 in each motor train unit 12.

In the operating situation depicted in FIG. 5, the brake unit 46 of the first head end power car of the first motor train unit 12.1 reports that a braking effect cannot be provided by the regenerative components of the brake unit 46, e.g., due to a technical failure. In response thereto, the setpoint braking effect to be applied by the two brake mechanisms 30 is redistributed to the brake units 46 of the rail vehicle unit 10. This is carried out in the control level for the entire rail vehicle unit by means of the braking effect management system 47, which allocates the partial braking effects to these brake units 46 on the basis of the data from all brake units 46 of the rail vehicle unit 10. In this case, the regenerative components of the brake units 46 are also prioritized. The gathering of the data and the distribution and allocation of the partial braking effects can be carried out by one of the central control devices 44 or by an interaction of said central control devices and by means of a data transmission taking place via the coupled-together bus systems 38. As a result of the distribution across the entire rail vehicle unit, the absence of a brake effect resulting from the brake unit 46 being defective and, therefore, incapable of applying said brake effect can be equalized—across the entire rail vehicle unit—among the brake units 46 of the entire rail vehicle 10 that are suitable for regenerative braking. In the case of a disadvantageous limitation of the equalization to the motor train unit 12.1 in which the faulty operation occurs, a greater load on the other brake units 46 that are equipped with regenerative components and/or an activation of the mechanical components of brake units 46 of this motor train unit 12.1 would be necessary as compared to the distribution according to FIG. 5.

In the exemplary embodiment under consideration, the distribution algorithm is also based on an optimized utilization of the coefficient of adhesion. In this case, the partial braking effects to be allocated can be calculated for the purpose of minimizing the coefficient of adhesion that is utilized, wherein the brake units 46 are preferably acted upon up to a defined limit of adhesion. If none of the brake units 46 equipped with an anti-skid device reports an active operating state of the allocated anti-skid device, the distribution algorithm takes a first defined limit of adhesion into consideration. If at least one of these brake units 46 reports an active operating state of the allocated anti-skid device, the distribution algorithm takes a second defined, lower limit of adhesion into consideration. Therefore, the distribution of a braking effect by means of the distribution algorithm can be easily adapted to poor rail conditions.

The invention claimed is:

1. A rail vehicle combination, comprising:
a plurality of motor train units including a first motor train unit and at least one second motor train unit;
each of said motor train units having a drive mechanism and a brake mechanism;
each said brake mechanism of said motor train units having a plurality of brake units;
a braking effect management system formed in a coupled state of said plurality of motor train units, said management system being connected to said brake mechanisms and being of a higher order than said brake mechanisms, and said braking effect management system being configured for distributing a braking effect to said brake units of said plurality of motor train units;
said braking effect management system including a data interface connected to said brake mechanisms of said motor train units and configured to receive braking parameters from several said brake units of said first and second motor train units, and said braking effect management system being equipped with a distribution algorithm configured for allocating a partial braking effect to each of the several said brake units on a basis of the braking parameters;
wherein said brake units are equipped with an anti-skid device, and the braking parameters of each of said brake units includes an operating state of said anti-skid device;
wherein the distribution algorithm is configured to take a first limit of adhesion between a rail and a wheel into consideration when calculating partial braking effects to be allocated if said anti-skid devices in said motor train units are inactive and, if at least one anti-skid device is active, taking a second limit of adhesion between the rail and the wheel into consideration when calculating the partial braking effects to be allocated, wherein the second limit of adhesion is less than the first limit of adhesion.

2. The rail vehicle unit according to claim 1, wherein each said motor train unit is formed as a combination of vehicle units and wherein at least one different brake unit of a particular brake mechanism is allocated to each of the vehicle units.

3. The rail vehicle unit according to claim 1, wherein said braking effect management system is configured for implementing a braking effect distribution for said brake mechanism of said at least one second motor train unit depending on at least one braking parameter of said brake mechanism of said first motor train unit.

4. The rail vehicle unit according to claim 3, wherein said braking effect management system is configured, in an event of a faulty operation of said brake mechanism of said first motor train unit, to allocate at least a portion of a braking effect to be compensated to at least one brake unit of said second motor train unit.

5. The rail vehicle unit according to claim 4, wherein said braking effect management system is configured, in an event of a complete failure of a brake unit of said brake mechanism of said first motor train unit, to uniformly distribute the braking effect to be compensated to the remaining brake units of said motor train units.

6. The rail vehicle unit according to claim 1, wherein the braking parameters of a given brake unit include a braking effect that can be applied by the given brake unit and a mass to be braked by the given brake unit.

7. The rail vehicle unit according to claim 1, wherein each of said brake mechanisms of said plurality of motor train units comprises a control device, each of said at least two motor train units comprises a control system, wherein said control systems are interconnected in the coupled state, and said braking effect management system is formed at least from said control devices interconnected via said control systems.

8. A method for braking a rail vehicle unit, the rail vehicle unit including a first motor train unit and at least one second motor train unit, each having a drive mechanism and a brake mechanism, wherein each of the brake mechanisms of the at least two motor train units has a plurality of brake units associated with respective wheels of the rail vehicle unit, the method which comprises:
forming a braking effect management system in a coupled state of the rail vehicle unit, the braking effect management system being connected to the brake mechanisms and being of a higher order than the brake mechanisms;
the braking effect management system having a data interface connected to the brake mechanisms of the motor train units and configured to receive braking parameters from a plurality of brake units of the first and second motor train units;
distributing a braking effect with the braking effect management system to the brake units of the at least two motor train units according to a distribution algorithm configured for allocating a partial braking effect to each of the brake units on a basis of the braking parameters;
wherein the brake units are equipped with an anti-skid device, and the braking parameters of each of the brake units includes an operating state of the anti-skid device;
wherein the distribution algorithm is configured to take a first limit of adhesion between the wheels and the rails into consideration when calculating partial braking effects to be allocated if the anti-skid devices in the motor train units are inactive and, if at least one anti-skid device is active, taking a second limit of adhesion between the wheels and the rails into consideration when calculating the partial braking effects to be allocated, wherein the second limit of adhesion is less than the first limit of adhesion; and
implementing a braking procedure according to the braking effect distribution.

* * * * *